July 16, 1946.  J. C. QUAYLE ET AL  2,404,191
DIELECTRIC HEATING ELECTRODE
Filed April 9, 1945
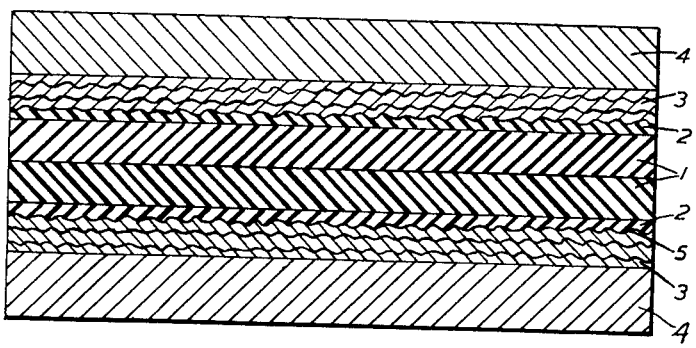
Inventors
Joshua C. Quayle & Peter Jones
By
Stebbins, Blenko & Webb
Attorneys Patented July 16, 1946

2,404,191

UNITED STATES PATENT OFFICE 2,404,191

DIELECTRIC HEATING ELECTRODE

Joshua Creer Quayle, Helsby, and Peter Jones, Kelsall, near Chester, England, assignors to British Insulated Cables Limited, Prescot, England, a British company Application April 9, 1945, Serial No. 587,353
In Great Britain April 22, 1944

5 Claims. (Cl. 219—47)

This invention relates to dielectric heating electrodes for apparatus for subjecting thermoplastic or thermosetting insulating material to pressure whilst heat is generated therein by subjecting it to the action of a high frequency alternating or fluctuating field of electric force for the purpose of moulding or shaping or embossing the material or welding or jointing it to other material of a similar or different nature. In the improved form of apparatus in accordance with the invention, pressure is applied to the material to be treated by a high frequency electrode having a composite facing which consists of an inner layer of high-loss, inorganic insulating material having an open fibrous structure and of an outer layer of high-loss, heat-stable, insulating material having a non-fibrous structure, which serves to prevent penetration and adhesion of the material to be treated.

In the foregoing statement, and hereinafter where the context permits, by "high-loss" insulating material we mean insulating material having a dielectric loss of the order of 0.01 as distinct from the so-called low-loss insulating materials, such as, for instance, certain grades of steatite, low-loss ebonite and moisture-free, mica-filled, borate glass, which have a dielectric loss value of the order of 0.001, and by "heat-stable" insulating material we mean insulating material which is heat-stable at the temperature to which the material to be treated is raised during the moulding or other operation.

For the inner layer of the composite facing we may use a woven fabric, or a felted fabric. The preferred material is a woven glass fabric, but we may use a felted fabric of glass, asbestos or slag wool. For the outer sealing or smoothing layer that will engage the material to be subjected to the high frequency and pressure treatment, we may use a thermosetting plastic material, for instance, a resin of the phenol-, cresol-, melamine- or urea-formaldehyde type. The resin, in varnish form, may be calendered on to the woven or felted fabric of inorganic fibrous material and subsequently baked, or it may be applied to a sheet of paper and the resin-coated paper may be applied, if necessary, with the aid of an adhesive, to the woven or felted fabric. Alternatively, we may use as the smoothing layer a thin sheet of a thermoplastic material that has a sufficiently high softening point and is not plasticised by the material under treatment. Polyvinylidene chloride is considered at present to be the most satisfactory thermoplastic material for the smooth outer layer, but this material cannot be used where the material to be heat-treated is polyvinyl chloride or other thermoplastic having a softening action on polyvinylidene chloride. Polyvinylidene chloride is sold in the form of fine grains, and with the aid of heat and pressure may be converted into the form of a smooth, non-porous sheet or film, which may be secured to the fibrous layer by a suitable adhesive, for instance, polyvinyl acetal, by pressing the sheet or film of polyvinylidene chloride and the fibrous inner layer together after heating the adhesive between them to its softening point.

By way of example, the accompanying drawing shows, diagrammatically and on an enlarged scale, a cross-section through a pair of electrodes 4, each provided in accordance with the invention with a composite facing consisting of an inner layer 3 of woven glass fabric and of a smooth-surfaced outer layer 2 of a resin of the kind described. The thickness of the fabric layer 3 may be of the order of 0.03 inch and that of the smoothing layer 2 of 0.01 inch. Between these faced electrodes are shown the overlapping ends 1 of two strips of thermoplastic material which are to be heated and welded together by being subjected to pressure and to the action of a high frequency electric field between the electrodes 4.

The fibrous inner layer of the composite facing will itself be heated by the high frequency field, though not to the same extent as the material under treatment, since little heat will be generated in the interstices between the fibres. Owing to its open fibrous structure, this inner layer will considerably restrict flow of heat to the electrode. In the smooth outer layer which serves to prevent penetration and adhesion of the material to be treated, heat will be generated more rapidly than in the heat-insulating fibrous layer. By selecting for the outer layer of the facing, a material having a dielectric loss value of the same order as that of the material to be treated, the temperature of its surface in contact with that of the material to be treated may be made to approximate that of the said material. Thus by the provision of the composite insulating layer, chilling of the material to be treated due to the presence of the electrode may be very much reduced or even completely avoided.

We have found such chilling to be a disadvantage in many cases, particularly in making lap welds in thermoplastic strip material without increasing the thickness of the strip. Here the provision of the composite facing on each electrode enables the weld to be made without the formation at each end thereof of a surface groove which locally reduces the mechanical strength of the welded strip.

What we claim as our invention is:

1. In apparatus for subjecting thermoplastic or thermosetting insulating material to pressure whilst generating heat therein by the action of a high frequency field of electric force, a high frequency electrode having a composite facing consisting of an inner layer of high-loss, inorganic, insulating material having an open fibrous structure and of an outer layer of high-loss, heat-stable, insulating material having a non-fibrous structure, by which pressure is applied to the material to be treated.

2. In apparatus for subjecting thermoplastic or thermosetting insulating material to pressure whilst generating heat therein by the action of a high frequency field of electric force, a high frequency electrode having a composite facing consisting of an inner layer of woven glass fabric and of an outer layer of high-loss, heat-stable insulating material having a non-fibrous structure, by which pressure is applied to the material to be treated.

3. In apparatus for subjecting thermoplastic or thermosetting insulating material to pressure whilst generating heat therein by the action of a high frequency field of electric force, a high frequency electrode having a composite facing consisting of an inner layer of felted fabric of a material selected from the group of high-loss, inorganic, fibrous materials consisting of glass fibre, asbestos fibre and slag wool, and of an outer layer of high-loss, heat-stable insulating material having a non-fibrous structure, by which pressure is applied to the material to be treated.

4. In apparatus for subjecting thermoplastic or thermosetting insulating material to pressure whilst generating heat therein by the action of a high frequency field of electric force, a high frequency electrode having a composite facing consisting of an inner layer of high-loss, inorganic, insulating material having an open fibrous structure and of an outer layer of a resin of the type selected from the group consisting of phenol-formaldehyde type resins, cresol-formaldehyde type resins, melamine-formaldehyde type resins and urea-formaldehyde type resins, by which pressure is applied to the material to be treated.

5. In apparatus for subjecting thermoplastic or thermosetting insulating material to pressure whilst generating heat therein by the action of a high frequency field of electric force, a high frequency electrode having a composite facing consisting of an inner layer of high-loss, inorganic, insulating material having an open fibrous structure and of an outer layer of polyvinylidene chloride, by which pressure is applied to the material to be treated.

JOSHUA CREER QUAYLE.
PETER JONES.